United States Patent
Kojima et al.

(10) Patent No.: US 10,847,796 B2
(45) Date of Patent: Nov. 24, 2020

(54) HIGH-PERFORMANCE POSITIVE ELECTRODE ACTIVE MATERIAL FOR LITHIUM ION BATTERY AND METHOD FOR PRODUCING SAME

(71) Applicant: Umicore, Brussels (BE)

(72) Inventors: Taku Kojima, Tokyo (JP); Kanichiro Inui, Tokyo (JP)

(73) Assignee: Umicore, Brussels (BE)

(*) Notice: Subject to any disclaimer, the term of this patent is extended or adjusted under 35 U.S.C. 154(b) by 0 days.

(21) Appl. No.: 16/479,232

(22) PCT Filed: Jan. 18, 2018

(86) PCT No.: PCT/JP2018/001425
§ 371 (c)(1),
(2) Date: Jul. 19, 2019

(87) PCT Pub. No.: WO2018/139338
PCT Pub. Date: Aug. 2, 2018

(65) Prior Publication Data
US 2019/0386304 A1    Dec. 19, 2019

(30) Foreign Application Priority Data

Jan. 27, 2017 (JP) .............................. 2017-013313

(51) Int. Cl.
| | |
|---|---|
| *H01B 1/08* | (2006.01) |
| *H01M 4/525* | (2010.01) |
| *C01G 53/00* | (2006.01) |
| *H01M 10/0525* | (2010.01) |
| *H01M 4/02* | (2006.01) |

(52) U.S. Cl.
CPC .......... *H01M 4/525* (2013.01); *C01G 53/006* (2013.01); *H01B 1/08* (2013.01); *H01M 10/0525* (2013.01); *H01M 2004/028* (2013.01)

(58) Field of Classification Search
CPC .. H01B 1/00; H01B 1/08; H01M 4/36; H01M 4/485; H01M 4/525
See application file for complete search history.

(56) References Cited

U.S. PATENT DOCUMENTS

| | | | |
|---|---|---|---|
| 2015/0188136 A1* | 7/2015 | Mori ..................... | H01M 4/525 429/223 |
| 2015/0249248 A1* | 9/2015 | Ishizaki ............ | H01M 10/0525 429/223 |
| 2019/0296347 A1* | 9/2019 | Sakai .................... | H01M 4/505 |

FOREIGN PATENT DOCUMENTS

| | | |
|---|---|---|
| JP | 201650120 A | 4/2016 |
| JP | 2016115658 A | 6/2016 |

OTHER PUBLICATIONS

English language machine translation of JP 2016-115658A (pub 2016).*
ISA/JP; International Search Report and Written Opinion for International Patent Application No. PCT/JP2018/001425 dated Apr. 3, 2018, 7 pages, (No English language translation provided).

* cited by examiner

*Primary Examiner* — Mark Kopec
(74) *Attorney, Agent, or Firm* — NK Patent Law

(57) ABSTRACT

Provided are a lithium nickel metal complex oxide powder having low alkalinity and excellent cycle characteristics, a lithium ion battery positive electrode active material containing the same, a lithium ion battery positive electrode using the active material, and a lithium ion battery having the positive electrode.

A lithium nickel metal complex oxide exhibiting excellent cycle characteristics and low alkalinity is successfully produced by controlling the crystal grain size and composition ratio in a lithium nickel metal complex oxide powder.

6 Claims, 1 Drawing Sheet

HIGH-PERFORMANCE POSITIVE ELECTRODE ACTIVE MATERIAL FOR LITHIUM ION BATTERY AND METHOD FOR PRODUCING SAME

CROSS-REFERENCE TO RELATED APPLICATIONS

This application is a U.S. National Stage application of International Patent Application No. PCT/JP2018/001425, filed on Jan. 18, 2018, which claims the benefit of Japanese Patent Application No. 2017-013313, filed on Jan. 27, 2017.

TECHNICAL FIELD

The present invention relates to a lithium nickel metal complex oxide powder having low alkalinity and excellent cycle characteristics, a lithium ion battery positive electrode active material containing the same, a lithium ion battery positive electrode using the active material, a lithium ion battery having the positive electrode, and a method for producing the lithium nickel metal complex oxide powder.

BACKGROUND ART

With the spread of small electronic devices such as smartphones and tablet personal computers, a battery that is an electric power source is required to be a high capacity battery that can withstand long-term use. Since a lithium ion battery is exclusively used as an electric power source for use in these portable devices, the performance improvement of the lithium ion battery in recent years is remarkable. On the other hand, it is inevitable that power consumption will increase due to the further enhancement of functions and performance of small electronic devices such as smartphones and tablet personal computers. Therefore, there is an increasing demand for higher performance of batteries.

In addition, in recent years, with the crisis awareness about energy demand and supply and the rise of environmental awareness, the installation of independent decentralized power generation facilities, such as wind power generation, mega solar power generation, and household solar power generation facilities, different from conventional centralized power plants, is increasing. However, the problem that the power generation facility using natural energy such as wind power generation or solar power generation facility is inferior to the conventional power generation facility in the stability of the supply of electricity has not been solved yet. Since the Great East Japan Earthquake that occurred on Mar. 11, 2011, and the deterioration of the power supply situation related to the shutdown of nuclear power plants caused after that earthquake, it has been widely recognized that it is important to secure electric power at business units and household units at the time of a disaster such as an earthquake. For this reason, attention has been focused on a stationary storage battery that secures an electric power source supply in the unit of a consumption point. However, according to the current technology, a very large electricity storage facility is required to secure an electric capacity by such a stationary storage battery, and such an electricity storage facility lacks practicability at present in a Japanese residential environment.

On the other hand, the development of electric vehicles such as electric vehicles, hybrid vehicles, plug-in hybrid vehicles, and fuel cell vehicles is being actively conducted in the automobile industry because energy efficiency exceeding internal combustion engines is unique in electric vehicles. However, as of 2016, electric vehicles that operate solely by electrical energy are not as widespread as hybrid vehicles, since the general range of a battery-only electric vehicle is shorter than that of an internal combustion vehicle, and there is also a problem with public facilities, such as a shortage of charging facilities in the city.

As mentioned above, a common product that supports industries such as electronic devices, securing of electric power, and electric vehicles is a battery, and at the present time, only a lithium ion battery has the potential to meet these requirements. However, even in the lithium ion battery, the performance is not sufficiently satisfactory, and in particular, the discharge capacity per unit volume is not yet sufficient for automotive applications. The cause of this is also the fact that the discharge capacity per unit volume of the positive electrode active material of the lithium ion battery is small.

Historically, a cobalt-based positive electrode active material represented by lithium cobaltate (LCO) has been used as the positive electrode active material for a lithium ion battery. Lithium cobaltate is used as a high-performance positive electrode active material in consideration of coating on the active material to cope with high voltage, improvement of an electrolyte, tuning of a charge/discharge management system, and the like, but there is almost no room for improvement that cobalt itself is a rare metal and expensive.

On the other hand, a nickel-based complex oxide, which has an advantage of being high in capacity, is also being actively studied and is partially applied to notebook computers and electric vehicles. Unlike cobalt, nickel does not fall under the category of rare metals, and there is no essential problem in terms of cost. Also in terms of an initial capacity, the discharge capacity per unit weight of LNCAO, which is a representative of nickel-based complex oxides, is larger than that of a cobalt-based positive electrode active material and exceeds 190 mAh/g. The nickel-based complex oxide has a large initial discharge capacity as described above, but has a problem that the cycle characteristics are inferior to existing positive electrode active materials such as lithium cobaltate and lithium manganate. It is known that the main cause of this is deterioration due to the accumulation of inactive materials on the surface of the active material by repetition of charge and discharge to block the ion diffusion path and the conductive path; deterioration due to oxidative decomposition of electrolyte components, since the charged positive electrode is in a strong oxidizing atmosphere; deterioration due to separation and isolation of the active material from other components of the positive electrode such as a binder, resulting from repeated expansion and contraction; and furthermore, deterioration in which expansion and contraction cause distortion in active material particles, resulting in mechanical damage to the active material particles.

In addition, in a case of a positive electrode active material consisting of a nickel-based complex oxide, it is particularly desired to suppress cation mixing and gelation as described below in preparation of the active material and preparation of a battery.

(Cation mixing) In the nickel-based positive electrode active material, so-called cation mix is easily generated, in which 3b site where nickel ion is present and a cation of 3a site where lithium ion is present are mutually exchanged, which contributes to a decrease in battery performance. In a case of preparing a nickel-based positive electrode active material in order to prevent such battery performance deterioration, it is general to suppress cation mixing by setting the molar ratio of other metals to lithium (Li/M ratio) to 1 or more, and to aim at the production of crystals of a more complete space group R-3m. By setting the Li/M ratio to 1 or more, the crystals themselves approach perfection, while the crystallites constituting the primary particles become large. Large crystallites have larger expansion and contraction in the c-axis direction with charge and discharge as compared to small crystallites, resulting in large distortion in the secondary particles, and thus, there is a problem of inducing secondary particle cracking.

(Gelation) Problems have also been pointed out in a case of preparing LNCAO as a positive electrode for a lithium ion battery. That is, in a case where LNCAO is used as the active material in a case of preparing the positive electrode, there is a problem that the slurry consisting of the active material and the binder is gelated to deteriorate the coatability of the slurry. The cause of gelation is believed to be due to the fact that the nickel-based complex oxide exhibiting strong alkalinity as compared to LCO desorbs hydrogen fluoride from PVDF (polyvinylidene fluoride-based polymer) used as a binder to cause cross-linking of PVDF resin chains. Although this problem is not directly related to the battery performance, it is very serious as a problem of production cost because the efficiency in manufacturing the battery is deteriorated. In order to solve this problem, the reduction of an alkaline substance contained in the nickel-based positive electrode active material has also been sought as well as the improvement of the discharge capacity.

For example, the following techniques have been proposed so far with such problems in mind. As a method of improving the cycle characteristics of a positive electrode active material for a lithium ion battery, Patent Document 1 discloses a method of using a positive electrode active material for a non-aqueous electrolyte secondary battery, characterized by including a surface-modified lithium-containing complex oxide particle represented by the general formula $Li_pN_xO_2$ (in which N is $Ni_yM_{1-x-y}$ and M is at least one of Co or Mn, $0.9 \leq p \leq 1.1$, $0.9 \leq x \leq 1.1$, $0.2 \leq y \leq 0.3$), in which the surface layer contains aluminum and the aluminum content within 5 nm of the surface layer is 1.2 or more in atomic ratio with respect to the total of Ni and element M.

Patent Document 2 discloses an Li—Ni complex oxide particle powder characterized by having a compositional formula of $Li_x(Ni_{1-y-w-z-v}Co_yMn_wMa_zMb_v)O_2$ ($0.9 \leq x \leq 1.1$, $0.05 \leq y \leq 0.25$, $0 \leq w \leq 0.25$, $0 \leq z \leq 0.15$, $0 \leq v \leq 0.03$, Ma is an amphoteric metal and is at least one metal selected from Al, Zn, and Sn, and Mb is at least one metal selected from Bi, Sb, Zr, B, and Mg), in which the BET specific surface area is 0.05 to 0.8 m$^2$/g, the atomic ratio (Ma/Ni) of the concentration of amphoteric metal to the concentration of Ni at the outermost surface of the particle is 2 to 6, and the concentration of the amphoteric metal at the outermost surface of the particle is higher than the concentration of the amphoteric metal at a position 50 nm from the outermost surface of the particle toward the central direction.

These techniques have contributed to a certain extent to the improvement of the cycle performance of the nickel-based positive electrode active material. However, in any of the methods, in a case of preparing the lithium metal complex oxide, a step of firing the precursor followed by coating with another metal or a step of washing with water while adding sulfuric acid is added, by which a complicated step has to be taken, which inevitably increases the cost.

On the other hand, as a means to reduce a pH of a positive electrode active material, for example, Patent Document 3 discloses a method of bringing a specific compound into contact with the positive electrode active material to convert an alkaline compound remaining in the positive electrode active material into a compound having low alkalinity. Patent Document 4 discloses a method of treating the fired lithium nickelate powder with high purity carbon dioxide gas. However, such a means also has a problem in cost as described above because it requires a new step in addition to the conventional production step.

CITATION LIST

Patent Literature

[PTL 1] Japanese Laid-open Patent Publication No. 2012-79703
[PTL 2] Japanese Laid-open Patent Publication No. 2012-230898
[PTL 3] Japanese Laid-open Patent Publication No. 2010-177030
[PTL 4] Japanese Laid-open Patent Publication No. H09-153360

SUMMARY OF INVENTION

Technical Problem

An object of the present invention is to provide a lithium nickel metal complex oxide which exhibits excellent cycle characteristics and low alkalinity by controlling a primary particle diameter of lithium nickel metal complex oxide particles contained in the lithium nickel metal complex oxide.

Solution to Problem

The present inventors succeeded in the production of a lithium nickel metal complex oxide powder which functions as a positive electrode active material exhibiting excellent cycle characteristics and low alkalinity by controlling a crystal grain size and a composition ratio of a lithium nickel metal complex oxide powder represented by LNCAO.

That is, the present invention is as follows.

(Invention 1) A lithium nickel metal complex oxide powder having the following features (i) and (ii).

(i) Its composition is represented by the following formula (1).

$$Li_aNi_{1-x-y}Co_xM_yO_b \quad (1)$$

(In the formula (1), $0.9 < a < 1.0$, $1.7 < b < 2.0$, $0.01 < x < 0.15$ and $0.005 < y < 0.10$. M is a metal element which contains an Al element and may further contain one or more elements selected from Mn, W, Nb, Mg, Zr and Zn.)

(ii) With respect to the diffraction peak attributed to the [003] plane in the X-ray diffraction profile, the crystal diameter calculated by Scherrer's equation is less than 70 nm.

(Invention 2) The lithium nickel metal complex oxide powder according to Invention 1, wherein the metal element M in the formula (1) of the feature (i) consists only of aluminum (Al).

(Invention 3) A positive electrode active material for a lithium ion battery, which includes the lithium nickel metal complex oxide powder according to Invention 1 or 2.

(Invention 4) A positive electrode for a lithium ion battery, which contains the positive electrode active material for a lithium ion battery according to Invention 3.

(Invention 5) A lithium ion battery, which has the positive electrode for a lithium ion battery according to Invention 4.

(Invention 6) A method for producing a lithium nickel metal complex oxide powder, which produces the lithium nickel metal complex oxide powder satisfying the following features (i) and (ii) by firing a mixture of a precursor consisting of a nickel metal complex hydroxide and a compound including aluminum and lithium, (i) Its composition is represented by the following formula (1).

$$Li_aNi_{1-x-y}Co_xM_yO_b \quad (1)$$

(In the formula (1), $0.9<a<1.0$, $1.7<b<2.0$, $0.01<x\le0.15$ and $0.005<y<0.10$.

M is a metal element which contains an Al element and may further contain one or more elements selected from Mn, W, Nb, Mg, Zr and Zn.)

(ii) With respect to the diffraction peak attributed to the [003] plane in the X-ray diffraction profile, the crystal diameter calculated by Scherrer's equation is less than 70 nm.

wherein the mixture is prepared through adding a precursor including a nickel metal complex hydroxide to an aluminum compound, a lithium compound, and an optional compound including one or more elements selected from Mn, W, Nb, Mg, Zr, and Zn, so that the ratio: Lm/Mm is less than 1 (Lm is the molar amount of the lithium element in the mixture, Mm is the total molar amount of the metal elements other than lithium in the mixture), and mixing the obtained compounds under shearing force, and wherein the firing has the following the first and the second steps;

$1^{st}$ firing step: a step of firing the mixture at a temperature ranging from 690° C. to 740° C. for time from 2 hours to 15 hours and then crashing the obtained fired product.

$2^{nd}$ firing step: a step of firing the mixture at a temperature ranging from 690° C. to 740° C. for time from 3 hours to 20 hours and then crashing the obtained fired product.

Advantageous Effects of Invention

The lithium nickel metal complex oxide powder of the present invention provides a positive electrode active material for a lithium ion battery which exhibits excellent cycle characteristics and low alkalinity. According to the present invention, a lithium ion battery exhibiting excellent cycle characteristics and high discharge capacity can be obtained.

DESCRIPTION OF EMBODIMENTS

[Lithium Nickel Metal Complex Oxide Powder]

Figure 1:
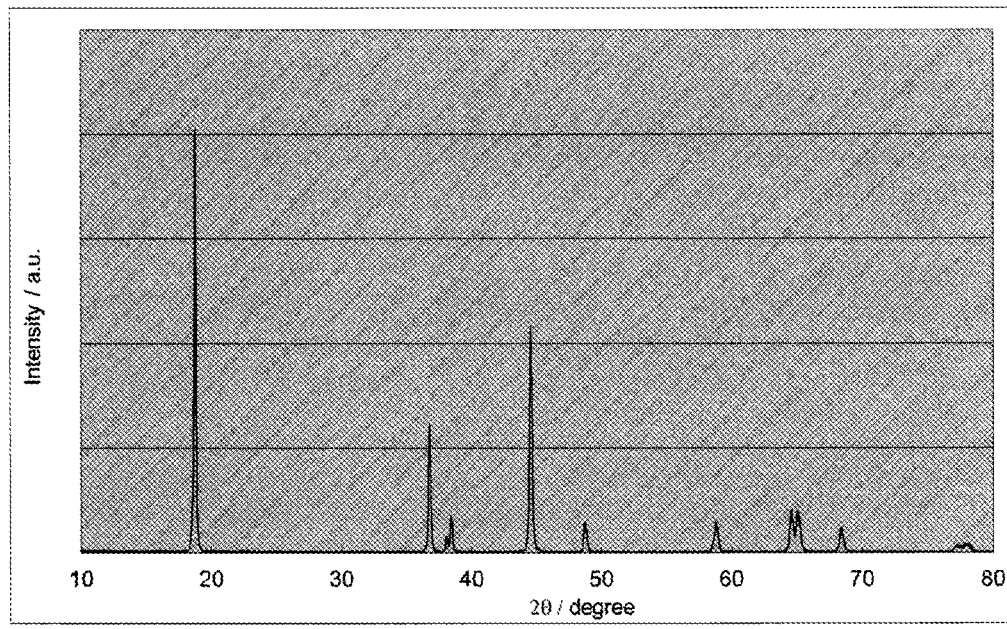
FIG. 1 is an X-ray diffraction pattern of an example of a lithium nickel metal complex oxide powder of the present invention.

The lithium nickel metal complex oxide powder of the present invention is a powder composed of a complex oxide that contains lithium, nickel, a small amount of cobalt, and a trace amount of aluminum as metal elements, and may further contain one or more elements selected from Mn, W, Nb, Mg, Zr, and Zn as trace amounts of other metal elements. The composition of such a lithium nickel metal complex oxide powder of the present invention is represented by the following formula (1).

$$Li_aNi_{1-x-y}Co_xM_yO_b \quad (1)$$

(In the formula (1), $0.9<a<1.0$, $1.7<b<2.0$, $0.01<x\le0.15$, and $0.005<y<0.10$, M is a metal element that contains an Al element and may further contain one or more elements selected from Mn, W, Nb, Mg, Zr, and Zn. The metal element M in such formula (1) preferably consists of aluminum (Al).)

The so-called LNCAO powder including the lithium nickel metal complex oxide powder of the present invention is known to have a crystal structure with space group R-3m composed of spherical secondary particles which are an aggregate of primary particles in which an octahedral layer consisting of lithium and oxygen; and an octahedral layer consisting of nickel, cobalt, the metal element M in the formula (1), and oxygen are stacked. The size of crystals constituting such primary particles can be calculated by Scherrer's equation. The Scherrer's equation is the following equation showing the relationship between the diffraction line width in powder X-ray diffraction and the size of the powder crystal (crystal diameter). This equation was proposed in 1918 and is still often used in practice.

$$D = \frac{K\lambda}{\beta \cos\theta}$$

In the Scherrer's equation, D represents a crystal size (crystal diameter), K represents a Scherrer constant, λ represents an X-ray wavelength, β represents a full-width at half maximum (FWHM), and θ represents a Bragg angle (a half of diffraction angle 2θ). In the calculation of the crystal diameter of the lithium nickel metal complex oxide powder of the present invention, the Scherrer's equation is applied to the diffraction peak attributed to the [003] plane in the X-ray diffraction profile. Here, a CuKα ray having a wavelength (λ) of 0.15402 nm is used, and 0.9 is used as K in Scherrer's equation.

The lithium nickel metal complex oxide powder of the present invention is characterized in that the crystal diameter determined by Scherrer's equation is less than 70 nm, typically less than 55 nm.

[Method for Producing Lithium Nickel Metal Complex Oxide Powder]

The lithium nickel metal complex oxide powder of the present invention is obtained by firing a mixture of a precursor consisting of a nickel metal complex hydroxide, an aluminum compound, and a compound containing lithium.

The nickel metal complex hydroxide constituting the above-mentioned precursor is usually obtained by using a coprecipitation reaction of nickel hydroxide and cobalt hydroxide in an alkaline aqueous solution.

Aluminum hydroxide is usually used as the aluminum compound added to the precursor. Lithium hydroxide is usually used as the lithium compound added to the precursor.

In a case where the lithium nickel metal complex oxide powder of the present invention further contains one or more elements selected from Mn, W, Nb, Mg, Zr, and Zn as optional trace elements in addition to aluminum, a compound containing these trace elements is added to the precursor together with the aluminum compound and the lithium compound.

The mixture is obtained by blending a precursor consisting of a nickel metal complex hydroxide, an aluminum compound, a lithium compound, and an optional compound containing the above-mentioned trace elements in such an amount ratio that the ratio (Lm/Mm) of the molar amount (Lm) of lithium element to the total molar amount (Mm) of metal elements other than lithium is finally less than 1, and mixing this blend under a shear force.

In the method for producing a lithium nickel metal complex oxide powder according to the present invention, the firing is carried out in two specific steps, that is, a $1^{st}$ firing step: a step of firing the mixture at a temperature ranging from 690° C. to 740° C., preferably 700° C. to 740° C. for 3 hours to 15 hours, preferably 6 hours to 12 hours and then crashing the obtained fired product, and then a $2^{nd}$ firing step: a step of firing the mixture at a temperature ranging from 690° C. to 740° C., preferably 700° C. to 740° C. for 3 hours to 20 hours, preferably 15 hours to 20 hours and then crashing the obtained fired product.

[Method for Producing $Li_aNi_{1-x-y}Co_xAl_yO_b$ Powder]

The composition of the lithium nickel metal complex oxide powder of the present invention is the case where the metal element M represents aluminum (Al) in the formula (1). The method for producing the lithium nickel metal complex oxide powder in this case is shown below. The following production procedure is understood as a typical and simple example of the lithium nickel metal complex oxide powder of the present invention.

(Dissolution of raw material) As a raw material of the precursor, a soluble metal salt, such as sulfate or nitrate, of the metal constituting the formula (1) can be used. In a case where the nitrate is used, the use of nitrate is not industrially preferable because the treatment of a waste liquid containing nitrate-nitrogen is expensive. In general, the sulfate of the metal constituting the formula (1) is used. Typically, nickel sulfate and cobalt sulfate are prepared as raw materials, and each sulfate is dissolved in water.

(Precipitation) A nickel sulfate aqueous solution, a cobalt sulfate aqueous solution, sodium hydroxide as a precipitant, and ammonia water as a complexing agent are mixed in a precipitation tank. A co-precipitate of nickel hydroxide and cobalt hydroxide is formed.

(Filtering and washing) The precipitate is filtered off, the water is removed, and the hydroxide cake is separated. The hydroxide cake is washed with an aqueous sodium hydroxide solution to remove sulfate ions. Further, the hydroxide cake is washed with pure water to remove sodium hydroxide. A precursor cake consisting of nickel hydroxide and cobalt hydroxide is thus obtained.

(Drying) The precursor cake is dried. The drying method may be any of hot air drying under atmospheric pressure, infrared radiation drying, vacuum drying, and the like. The precursor cake can be dried in a short time by carrying out vacuum drying. The precursor cake is dried until the water content in the precursor is about 1% by weight.

(Powder mixing) An aluminum hydroxide powder and a lithium hydroxide powder are added to the dried precursor powder, followed by mixing under a shear force. At this time, the precursor, the aluminum hydroxide powder, and the lithium hydroxide powder are blended in such an amount ratio that the ratio (Lm/Mm) of the molar amount (Lm) of lithium to the total molar amount (Mm) of metals other than lithium is finally less than 1. In the present invention, by setting the ratio (Lm/Mm) to such a range, the crystal growth of the lithium nickel metal complex oxide in firing described later is suppressed, and the diameter of crystals constituting the primary particles of the obtained lithium nickel metal complex oxide powder can be kept within a certain range. The means for applying a shear force to the obtained blend is not particularly limited. Here, it is possible to use various mixers used for mixing and grinding of powdery matter and granular matter.

($1^{st}$ firing step) The mixture obtained by the above procedure is fired at a temperature ranging from 690° C. to 740° C., preferably 700° C. to 740° C., for 2 hours to 15 hours, preferably 2 hours to 6 hours. The obtained fired product is crashed by a crusher such as a jet mill, a cyclone mill, or a ball mill. This crashing can suppress aggregation of particles in the subsequent second firing.

($2^{nd}$ firing step) The mixture obtained through the $1^{st}$ firing step is fired at a temperature ranging from 690° C. to 740° C., preferably 700° C. to 740° C., for 3 to 20 hours, preferably 6 to 10 hours. The obtained fired product is crashed by a crusher such as a jet mill, a cyclone mill, or a ball mill. By this crashing, the fired product is finely granulated appropriately.

The lithium nickel metal complex oxide powder of the present invention thus obtained gives a positive electrode agent slurry which is uniform and excellent in coatability. Such a positive electrode agent slurry improves the production efficiency of the positive electrode and suppresses gelation at the time of preparation of the electrode. In addition, the ion release characteristics of the positive electrode active material are also stabilized, and the battery performance is also improved. The cycle characteristics are particularly improved in the lithium ion battery using the lithium nickel metal complex oxide powder of the present invention.

The positive electrode active material of a lithium ion battery may be constituted only by the lithium nickel metal complex oxide powder of the present invention, or other positive electrode active materials for a lithium ion secondary battery may be mixed in the lithium nickel metal complex oxide powder of the present invention in such an amount that the advantages thereof appear. For example, a mixture of 50 parts by weight of the lithium nickel metal complex oxide powder of the present invention and 50 parts by weight of a positive electrode active material for a lithium ion secondary battery other than that of the present invention can be used as a positive electrode active material. In a case of producing the positive electrode of a lithium ion battery, the positive electrode active material containing the above-mentioned lithium nickel metal complex oxide powder of the present invention, a conductive auxiliary agent, a binder, and an organic solvent for dispersion are added to prepare a mixture slurry for a positive electrode, which is then applied to the electrode.

EXAMPLES

Example 1

A precursor was prepared through a coprecipitation reaction of an aqueous solution of nickel sulfate and cobalt sulfate, filtration, washing, and drying. This precursor was composed of nickel hydroxide and cobalt hydroxide, and had a median diameter ($D_{50}$) of 5.8 μm.

Aluminum hydroxide and lithium hydroxide were added to this precursor, and the resulting mixture was sheared and mixed with a mixer. In addition, in the production of the mixture, the aluminum hydroxide was added so that the amount of aluminum element was 5 mol % with respect to the amount of the precursor. In the production of the mixture, the amount of lithium hydroxide was adjusted so that the ratio (Lm/Mm) of the molar amount (Lm) of lithium element to the total molar amount (Mm) of nickel element, cobalt element, and aluminum element was 0.980.

(1st firing step) The resulting mixture was placed in a mullite ceramic sheath, introduced into a roller hearth kiln furnace set at a furnace temperature of 730° C., and fired for 2.5 hours. The fired product was removed from the furnace and crashed.

($2^{nd}$ firing step) The crashed fired product was further introduced into a roller hearth kiln furnace set at a furnace temperature of 730° C. and fired for 8.5 hours. The fired product was removed from the furnace and crashed. Thus, a lithium nickel metal complex oxide powder was obtained.

The obtained lithium nickel metal complex oxide powder was analyzed and evaluated by the following method. The results are shown in Table 1.

(Composition)

3 ml of concentrated nitric acid and 6 ml of concentrated hydrochloric acid were added to 0.3 g of the lithium nickel metal complex oxide powder obtained, and the mixture was heated and dissolved at 200° C. The whole liquid was transferred to a 100 ml measuring flask and diluted to 100 ml. 3 ml of the dilution was taken and re-diluted to 100 ml. The element content of the obtained dilution was measured by an inductively coupled plasma emission spectrometer (Thermo Fisher Scientific iCAP 6000). From the measurement results, the composition of the lithium nickel metal complex oxide and the ratio (Lm/Mm) of the molar amount (Lm) of lithium element to the total molar amount (Mm) of metal elements other than lithium were determined.

(Crystal Structure)

The X-ray diffraction analysis of the lithium nickel metal complex oxide powder obtained was carried out by an X-ray diffractometer (PANalytical X'PERT-MPD, irradiation with a CuKα ray having a wavelength (λ) of 0.15402 nm). The crystal diameter (D) was calculated from the following Scherrer's equation for the diffraction peak attributed to the [003] plane of the obtained X-ray diffraction pattern. The results are shown in Table 1.

$$D = \frac{K\lambda}{\beta\cos\theta}$$

(D represents a crystal size (crystal diameter), K represents a Scherrer constant, 0.9 in this analysis, A represents an X-ray wavelength, β represents a full-width at half maximum (FWHM), and θ represents a Bragg angle (a half of diffraction angle 2θ))

(Alkaline Strength)

In order to predict the degree of gelation of the positive electrode agent slurry in a case of producing a positive electrode using the obtained lithium nickel metal complex oxide powder, the alkaline strength of the obtained lithium nickel metal complex oxide powder was measured. That is, 2 g of the obtained lithium nickel metal complex oxide powder was added to 100 ml of pure water at 25° C., followed by stirring with a magnetic stirrer for 3 minutes and then suction-filtration. The pH of the obtained filtrate was measured with a Horiba pH meter. The results are shown in Table 1.

(Particle Size Distribution)

The obtained lithium nickel metal complex oxide powder was passed through a standard sieve with a nominal opening of 53 μm specified in JIS Z 8801-1:2006. The particle size distribution of the lithium nickel metal complex oxide particles having passed through the sieve was measured with a particle size distribution meter (laser scattering particle size distribution analyzer LA-950 manufactured by Horiba, Ltd.) to determine a median diameter $D_{50}$. The results are shown in Table 1.

(Initial Discharge Capacity)

1 part by weight of acetylene black (manufactured by Denka Company Limited), 5 parts by weight of graphite carbon (manufactured by Nippon Graphite Industries, Co., Ltd.), and 4 parts by weight of polyvinylidene fluoride (manufactured by Kureha Corporation) were added to 100 parts by weight of the obtained nickel lithium metal complex oxide powder. N-methyl pyrrolidone as a dispersing solvent was further added thereto to prepare a slurry. This slurry was applied to an aluminum foil serving as a current collector, dried, and pressed. Using the resulting structure as a positive electrode, a lithium metal foil as a negative electrode, and 1 mol/L of LiPF6 dissolved in an equal mixed solvent of ethylene carbonate and diethyl carbonate (EC:DEC=1:1) as an electrolyte, a 2032 type coin battery was prepared. The initial discharge capacity at the time of carrying out 0.1 C charge-0.1 C discharge of this battery was measured. The results are shown in Table 1.

(Cycle Characteristics)

After the initial discharge capacity was measured, charge and discharge of 50 cycles were repeated, with 0.5 C charge-1.0 C discharge as one cycle. The discharge capacity at the end of charge and discharge (discharge capacity after 50 cycles) was measured. The ratio of discharge capacity after 50 cycles to initial discharge capacity (discharge capacity retention rate) was calculated. The results are shown in Table 1.

Example 2

A precursor having a $D_{50}$ of 6.0 μm was produced in the same manner as in Example 1. A lithium nickel metal complex oxide powder was produced, analyzed, and evaluated under the same conditions as in Example 1 except that this precursor was used. The results are shown in Table 1.

Example 3

A precursor having a $D_{50}$ of 5.9 μm was produced in the same manner as in Example 1. A lithium nickel metal complex oxide powder was produced, analyzed, and evaluated under the same conditions as in Example 1 except that this precursor was used. The results are shown in Table 1.

Comparative Example 1

Aluminum hydroxide and lithium hydroxide were added to the precursor produced under the same conditions as in Example 1, and the resulting mixture was sheared and mixed with a mixer. In addition, in the production of the mixture, the aluminum hydroxide was added so that the amount of aluminum element was 5 mol % with respect to the amount of the precursor. In the production of the mixture, the amount of lithium hydroxide was adjusted so that the ratio (Lm/Mm) of the molar amount (Lm) of lithium element to the total molar amount (Mm) of nickel element, cobalt element, and aluminum element was 1.005.

($1^{st}$ firing step) The resulting mixture was placed in a mullite ceramic sheath, introduced into a roller hearth kiln furnace set at a furnace temperature of 730° C., and fired for 4 hours. The fired product was removed from the furnace and crashed.

(2nd firing step) The crashed fired product was further introduced into a roller hearth kiln furnace set at a furnace temperature of 770° C. and fired for 10 hours. The fired product was removed from the furnace and crashed. Thus, a lithium nickel metal complex oxide powder was obtained.

This lithium nickel metal complex oxide powder was analyzed and evaluated in the same manner as in Example 1. The results are shown in Table 1.

Comparative Example 2

A precursor having a $D_{50}$ of 12.2 μm was produced in the same manner as in Example 1. Aluminum hydroxide and lithium hydroxide were added to this precursor, and the resulting mixture was sheared and mixed with a mixer. In addition, in the production of the mixture, the aluminum hydroxide was added so that the amount of aluminum element was 2 mol % with respect to the amount of the precursor. In the production of the mixture, the amount of lithium hydroxide was adjusted so that the ratio (Lm/Mm) of the molar amount (Lm) of lithium element to the total molar amount (Mm) of nickel element, cobalt element, and aluminum element was 1.020.

The resulting mixture was placed in a mullite ceramic sheath, introduced into a roller hearth kiln furnace set at a furnace temperature of 790° C., and fired for 5 hours. The fired product was removed from the furnace and crashed. Thus, a lithium nickel metal complex oxide powder for comparison was obtained. This lithium nickel metal complex oxide powder for comparison was analyzed and evaluated in the same manner as in Example 1. The results are shown in Table 1.

ratio (Lm/Mm) of the molar amount (Lm) of lithium element to the total molar amount (Mm) of nickel element, cobalt element, and aluminum element is controlled to be relatively low. The crystal diameter is controlled to less than 70 nm. Such a lithium nickel metal complex oxide powder of the present invention has a lower alkaline strength and a higher discharge capacity retention rate than the lithium nickel metal complex oxide powder for comparison. This means that the gelation of the positive electrode slurry using the lithium nickel metal complex oxide powder of the present invention is less likely to occur, and the cycle characteristics of the lithium ion battery using the lithium nickel metal complex oxide powder of the present invention are excellent.

Furthermore, FIG. 1 shows an X-ray diffraction pattern of the lithium nickel metal complex oxide powder obtained in Example 1. From FIG. 1, it can be confirmed that the crystal structure of the lithium nickel metal complex oxide powder obtained in Example 1 has a space group R-3m.

Figure 2:
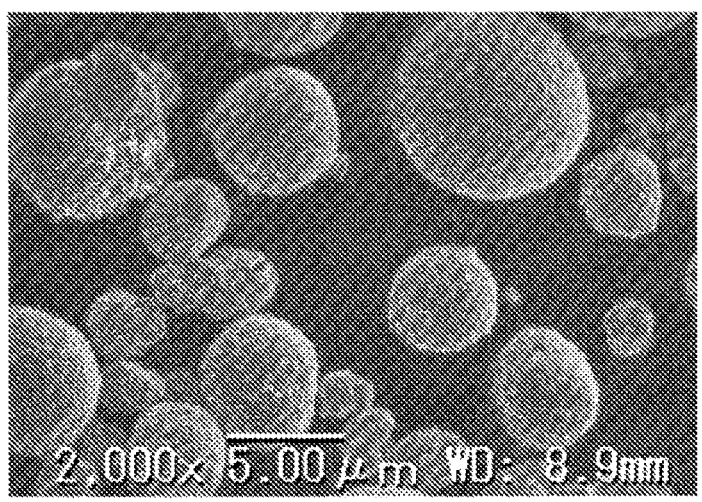
FIG. 2 is an electron microscopic image of an example of the lithium nickel metal complex oxide powder of the present invention.

Further, the lithium nickel metal complex oxide powder obtained in Example 1 was applied onto a conductive pressure-sensitive adhesive tape, and observed with an electron microscope (VE-9800 manufactured by Keyence Corporation). The results are shown in FIG. 2. From FIG. 2, it can be confirmed that the lithium nickel metal complex oxide powder obtained in Example 1 is spherical particles, and each spherical particle is composed of smaller primary particles.

INDUSTRIAL APPLICABILITY

The present invention is useful as a means for supplying a high-performance positive electrode active material for a lithium ion battery. The lithium nickel metal complex oxide powder obtained by the present invention and a lithium ion battery using the same contribute to the improvement of the

TABLE 1

| | Lithium nickel metal complex oxide powder | | | | | | | Production |
|---|---|---|---|---|---|---|---|---|
| | Composition $Li_aNi_{1-x-y}Co_xAl_yO_b$ | | | | | Crystal | Particle size | conditions Upon mixing |
| | a | 1 − x − y | x | y | b | Upon completion Lm/Mm | diameter D (nm) | distribution $D_{50}$ (μm) | with precursor Lm/Mm |
| Example 1 | 0.99 | 0.80 | 0.15 | 0.05 | 1.87 | 0.99 | 57 | 6.10 | 0.980 |
| Example 2 | 0.99 | 0.80 | 0.15 | 0.05 | 1.86 | 0.99 | 54 | 6.64 | 0.980 |
| Example 3 | 0.99 | 0.80 | 0.15 | 0.05 | 1.96 | 0.99 | 68 | 6.31 | 0.980 |
| Comparative Example 1 | 1.00 | 0.80 | 0.15 | 0.05 | 1.87 | 1.00 | 73 | 6.80 | 1.005 |
| Comparative Example 2 | 1.11 | 0.82 | 0.16 | 0.02 | 1.98 | 1.11 | 126 | 11.60 | 1.020 |

| | Production conditions | | | | Evaluation | | |
|---|---|---|---|---|---|---|---|
| | 1st firing | | 2nd firing | | | | Discharge |
| | Temperature (° C.) | Time (h) | Temperature (° C.) | Time (h) | Alkaline strength (pH) | Initial discharge capacity (mAh/g) | capacity retention rate (%) |
| Example 1 | 730 | 2.5 | 730 | 8.5 | 11.56 | 172 | 100.0 |
| Example 2 | 730 | 2.5 | 730 | 8.5 | 11.55 | 183 | 98.0 |
| Example 3 | 730 | 2.5 | 730 | 8.5 | 11.53 | 180 | 99.0 |
| Comparative Example 1 | 730 | 4 | 770 | 10 | 11.73 | 188 | 91.0 |
| Comparative Example 2 | 790 | 5 | | | 11.66 | 197 | 92.5 |

As Table 1 shows, the lithium nickel metal complex oxide powder of the present invention has a composition represented by the above-mentioned formula (1), in which the performance of a portable information terminal and a battery-equipped vehicle.

The invention claimed is:

1. A lithium nickel metal complex oxide powder having the following features (i) and (ii):
   (i) a composition of the powder is represented by the formula (1)

$$Li_a Ni_{1-x-y} Co_x M_y O_b \tag{1}$$

wherein, in formula (1), $0.9<a<1.0$, $1.7<b<2.0$, $0.01<x<0.15$ and $0.005<y<0.10$, M is a metal element comprising an Al element and optionally further comprising one or more elements selected from the group consisting of Mn, W, Nb, Mg, Zr and Zn; and
   (ii) with respect to the diffraction peak attributed to the [003] plane in the X-ray diffraction profile, the crystal diameter calculated by Scherrer's equation is less than 70 nm.

2. The lithium nickel metal complex oxide powder according to claim 1, wherein the metal element M consists only of aluminum (Al).

3. A positive electrode active material for a lithium ion battery, which comprises the lithium nickel metal complex oxide powder according to claim 1.

4. A positive electrode for a lithium ion battery, which contains the positive electrode active material according to claim 3.

5. A lithium ion battery, which has the positive electrode for a lithium ion battery according to claim 4.

6. A method for producing the lithium nickel metal complex oxide powder of claim 1, comprising preparing a mixture by adding a precursor comprising a nickel metal complex hydroxide to an aluminum compound, a lithium compound, and an optional compound comprising one or more elements selected from the group consisting of Mn, W, Nb, Mg, Zr, and Zn, such that the ratio: Lm/Mm is less than 1, wherein Lm is the molar amount of the lithium element in the mixture and Mm is the total molar amount of the metal elements other than lithium in the mixture, and mixing the added precursor and compounds under shearing force, and firing the mixture, wherein firing comprises the following first and the second steps, 1) $1^{st}$ firing step: firing the mixture at a temperature ranging from 690° C. to 740° C. for time from 2 hours to 15 hours and then crushing the obtained first fired product, and 2) $2^{nd}$ firing step: firing the first fired product at a temperature ranging from 690° C. to 740° C. for time from 3 hours to 20 hours and then crushing the obtained second fired product.

* * * * *